United States Patent
Hu

(10) Patent No.: US 6,250,461 B1
(45) Date of Patent: Jun. 26, 2001

(54) RETAINING CENTER OF A DVD/VCD/CD BOX

(75) Inventor: Wen-Long Hu, Taoyuan (TW)

(73) Assignee: Wah-De Electron Co., Ltd. (TW)

( * ) Notice: Subject to any disclaimer, the term of this patent is extended or adjusted under 35 U.S.C. 154(b) by 0 days.

(21) Appl. No.: 09/643,421

(22) Filed: Aug. 22, 2000

(51) Int. Cl.[7] .................................................. B65D 85/57
(52) U.S. Cl. ............................... 206/310; 206/308.1
(58) Field of Search .............................. 206/308.1, 309, 206/310, 307, 311, 312

(56) References Cited

U.S. PATENT DOCUMENTS

| 5,788,068 | * | 8/1998 | Fraser et al. | 206/310 |
| 5,944,181 | * | 8/1999 | Lau | 206/310 |
| 5,988,375 | * | 11/1999 | Chang | 206/310 |
| 6,085,900 | * | 7/2000 | Wong | 206/310 |

* cited by examiner

Primary Examiner—Luan K. Bui
(74) Attorney, Agent, or Firm—Jackson Walker L.L.P.

(57) ABSTRACT

A retaining center for a DVD/VCD/CD box includes a tray (10) with a plurality of inclined first segments (211), a plurality of inclined second segments (212) disposed equally among the first segments (211), a column (23) formed in a center of the tray (10) and extending up through the first and second segments (211,212). The column (23) has a resilient top which when compressed can receive a central hole of a DVD/VCD/CD, and two lips (2322) to securely retain the DVD/VCD/CD on the column (23). The first segments (211) each have a distal edge with a common height above a common height of distal edges of the second segments (212) until the first segments (211) are resiliently deformed downward. The height of the distal edges of the first segments (211) is below the lips (2322).

7 Claims, 6 Drawing Sheets

RETAINING CENTER OF A DVD/VCD/CD BOX

BACKGROUND OF THE INVENTION

1. Field of the Invention

The present invention relates to a retaining center of a compact disc (CD) box and in particular, a retaining center which can securely retain a DVD/VCD/CD without fracture and which allows easy insertion and removal from the DVD/VCD/CD box.

2. Background

Compact discs have become an indispensable medium for storage of information, whether as music or text, etc. Such discs are commonly stored in plastic boxes when not in use to protect the surfaces of the discs despite them generally being impervious to reduced information playback through scratching, dust, finger marks, etc. The boxes generally have a resilient center onto which the disc is secured by means of a central hole in the disc. The central hole has a diameter slightly smaller than a diameter of the center in an extended condition.

FIGS. 7 and 8 show a first example of a prior art resilient center for a DVD/VCD/CD box, wherein the center is formed protruding from a base plate of the box. The center includes an outer ring (61) and an upright boss extending integrally from the ring (61). The boss comprises a plurality of equi-spaced ribs separated by a corresponding plurality of equi-spaced slits (62) which all communicate with a central opening. To fit a DVD/VCD/CD to such a box, the central hole of the DVD/VCD/CD is aligned with an outer periphery of the boss and then pressure via a user's finger tips is put on the top of the DVD/VCD/CD, whereby the ribs are temporarily deformed inwards to the central opening of the boss. When pressure from the user's finger tips is released, the ribs spring back outward a little due to resilience caused by the slits (62) and the DVD/VCD/CD is gripped by tension in the ribs. To release the DVD/VCD/CD from the box, the user has to press down a top of the boss whereby the ribs are forced inward again towards the center of the boss, until a diameter across the ribs is smaller than the diameter of the central hole of the DVD/VCD/CD, and then the DVD/VCD/CD can be removed. Although such a box works quite well in a crude way, it is found that the ribs often fracture, especially after repeated removal and insertion of the DVD/VCD/CD, and then the DVD/VCD/CD is no longer reliably retained in the box.

A second prior art DVD/VCD/CD box (70) with a resilient center is shown in FIG. 9, wherein a mount (71) includes two symmetrical inclined portions (72) each with a lower end integrally formed with a base plate, and an upper distal end formed with a substantially semi-circular boss (73). The semi-circular periphery of each boss (73) has a lip (74) formed on a top edge thereof. A face opposite each semi-circular periphery is curved such that an "S" shaped slit is defined between the two bosses (73). A diameter across the bosses (73) is slightly smaller than the diameter of the central hole of the DVD/VCD/CD, and a distance across the lips (74) is slightly smaller than the diameter of the central hole of the DVD/VCD/CD.

In use, the central hole of the DVD/VCD/CD is aligned with the bosses (73) and then the DVD/VCD/CD is pushed down such that the inclined portions (72) are also pushed down whereby the bosses (73) move towards each other and narrow the width of the slit, and thus the distance across the lips (74) is now smaller than the diameter of the central hole of the DVD/VCD/CD. Thus the DVD/VCD/CD can be secured on the bosses (73) and below the lips (74). Once pressure from the finger tips of the user is released, resiliency of the inclined portions (72) urges the bosses (73) outward, such that the lips (74) return to have the distance thereacross greater than the central diameter of the DVD/VCD/CD. A reversal of the aforementioned process enables a user to release the DVD/VCD/CD from the box. There are three drawbacks found with this second prior art DVD/VCD/CD box:

1. difficulty is often experienced by users in locating the central hole of the DVD/VCD/CD over the bosses (73);
2. it is found that the retention of the bosses is not reliable, and so users do not have complete confidence in such a box; and
3. it is difficult to line up the DVD/VCD/CD in a flat way parallel to the box, and so the DVD/VCD/CD is often stored askew which overstresses the retainer and ultimately leads to failure thereof.

Thus, there is a long and unfulfilled need for a retaining center for a DVD/VCD/CD box which does not fracture, and which can accurately and reliably receive a DVD/VCD/CD thereon.

SUMMARY OF THE INVENTION

The main objective of the invention is to provide a retaining center for a DVD/VCD/CD box, in which the retaining center does not fracture easily.

Another object of the present invention is to provide a retaining center for a DVD/VCD/CD box, in which the retaining center is easy to align with a central hole of the DVD/VCD/CD.

Yet another object of the present invention is to provide a retaining center for a DVD/VCD/CD box, in which the retaining center reliably grips a periphery defining the central hole of the DVD/VCD/CD.

Other objects, advantages and novel features of the invention will become more clearly and readily apparent from the following detailed description when taken in conjunction with the accompanying drawings.

BRIEF DESCRIPTION OF THE PREFERRED EMBODIMENT

DETAILED DESCRIPTION OF THE PREFERRED EMBODIMENT

Figure 1:
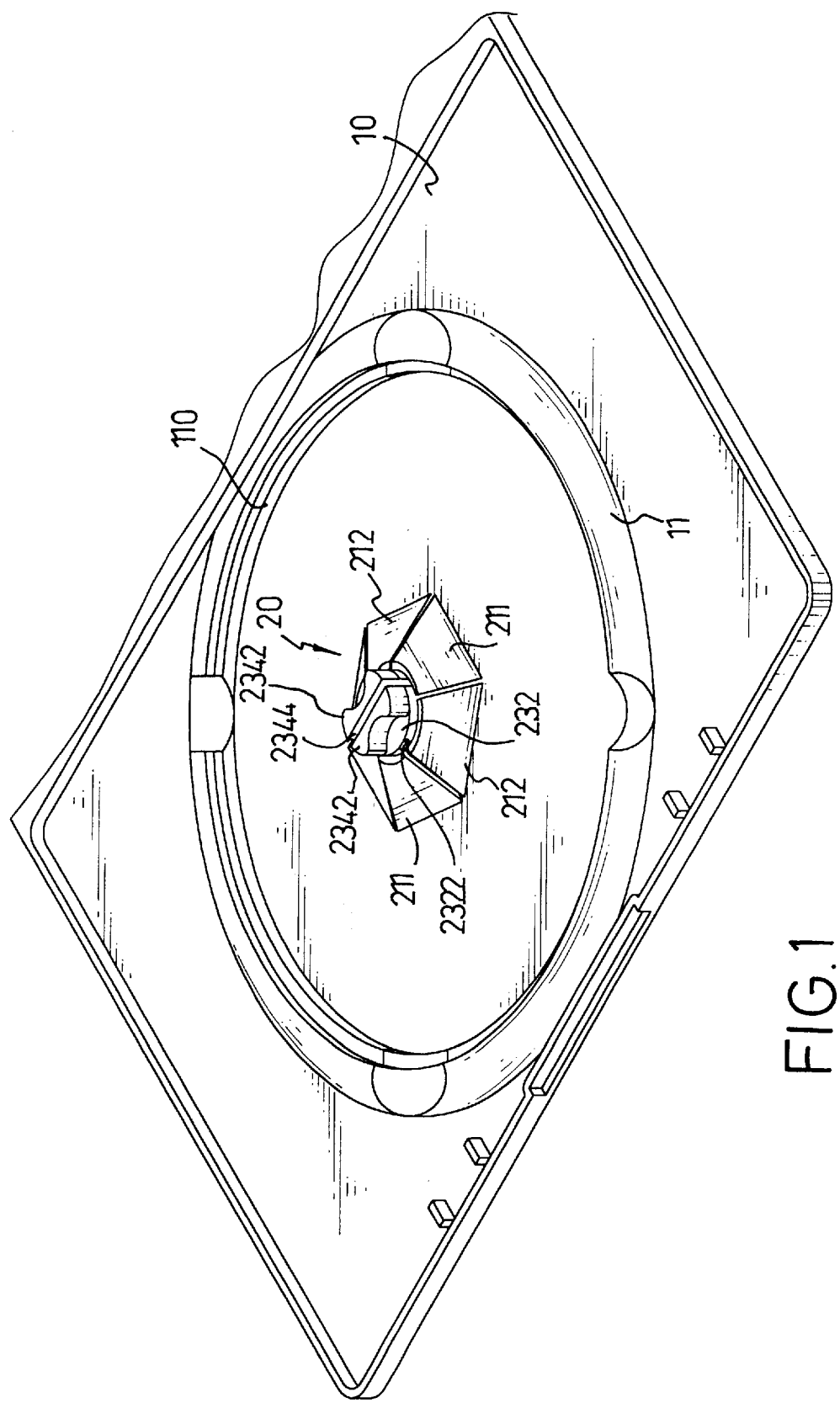
FIG. 1 is a perspective view of a box for a DVD/VCD/CD with an improved retaining center.
Figure 2:
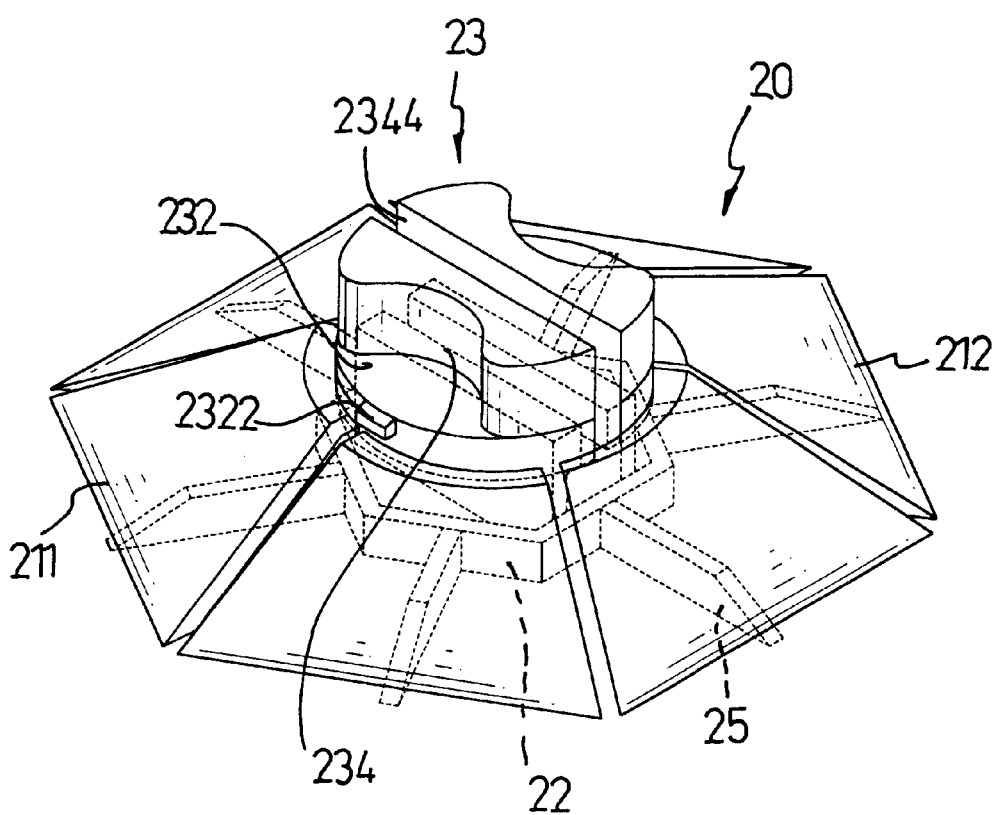
FIG. 2 is an enlarged view of the retaining center of the DVD/VCD/CD box of FIG. 1.
Figure 3:
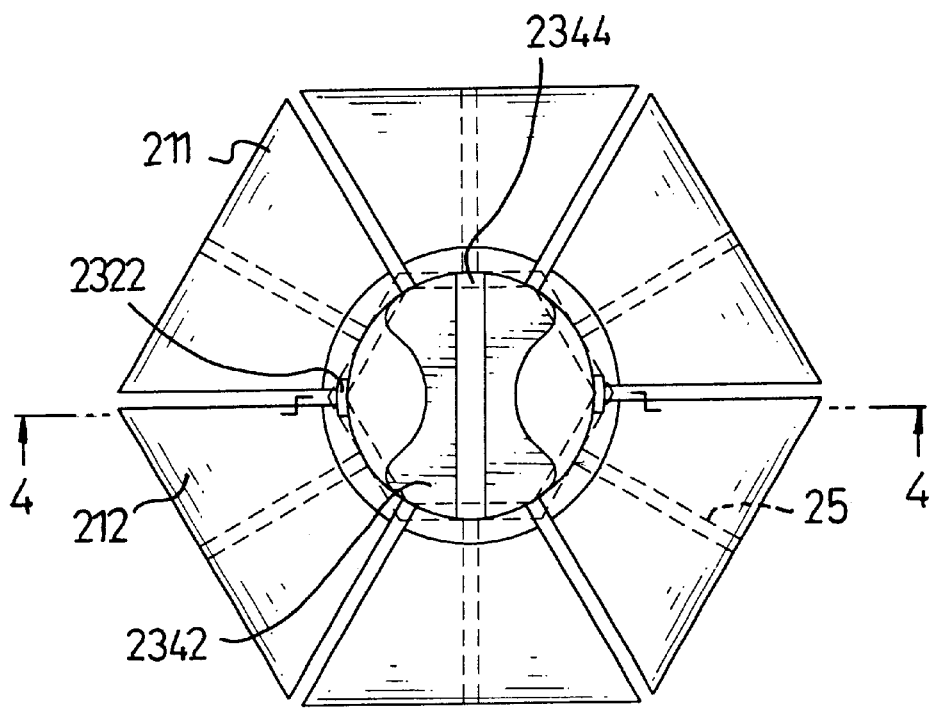
FIG. 3 is a top view of the retaining center shown in FIG. 2.

Referring to the figures and especially FIGS. 1, 2 and 3, a DVD/VCD/CD box includes a tray (10) with a retaining center (20) formed in a center thereof. Although the invention refers to a DVD/VCD/CD box, it is to be appreciated that boxes for other similar information discs, such as VCDs, DVDs, are equally applicable.

The tray (10) includes a raised ring portion (11) with an inner periphery (110) size to receive an outer periphery of a DVD/VCD/CD (30) therein.

The retaining center (20) includes a polygonal base (22), a plurality of inclined first segments (211), a plurality of inclined second segments (212) equally interspersed between the first segments (211), and a central column (23) extending up through a central opening defined by arcuate distal edges of the first and second segments (211, 212). In this embodiment, there are three first segments (211) and three second segments (212) all of a common size, and the polygonal base (22) is hexagonal. However, it is to be appreciated that the shapes and quantities are not limited to those preferred aforementioned.

The first and second segments (211, 212) each have a lower fixed end integrally formed with the base (22), and incline upwardly to the respective arcuate distal edge. The distal edges of the first segments (211) each have a same height which is greater than a common height of the distal edges of the second segments (212). The base (22) is formed beneath the first and second segments (211, 212) and straight edges of the base (22) parallely align with respective lower fixed ends thereof. A plurality (in this embodiment, six) of ribs (25) respectively extend through centers of the straight edges of the base (22) to an under face of a corresponding one of the first and second segments (211, 212).

Figure 4:
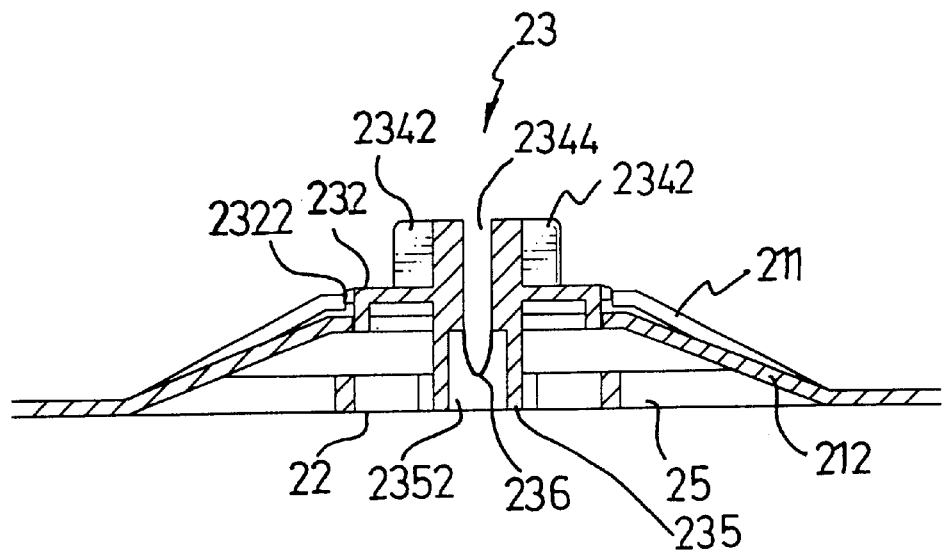
FIG. 4 is a cross-sectional view of the retaining center of FIG. 1, in a non-receiving mode.
Figure 5:
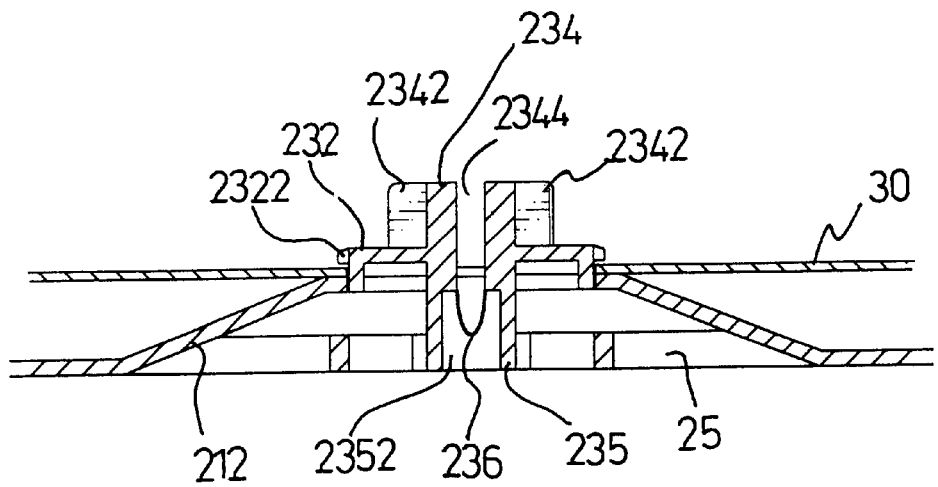
FIG. 5 is a cross-sectional view of the retaining center of FIG. 1, with a DVD/VCD/CD fitted thereover.
Figure 6:
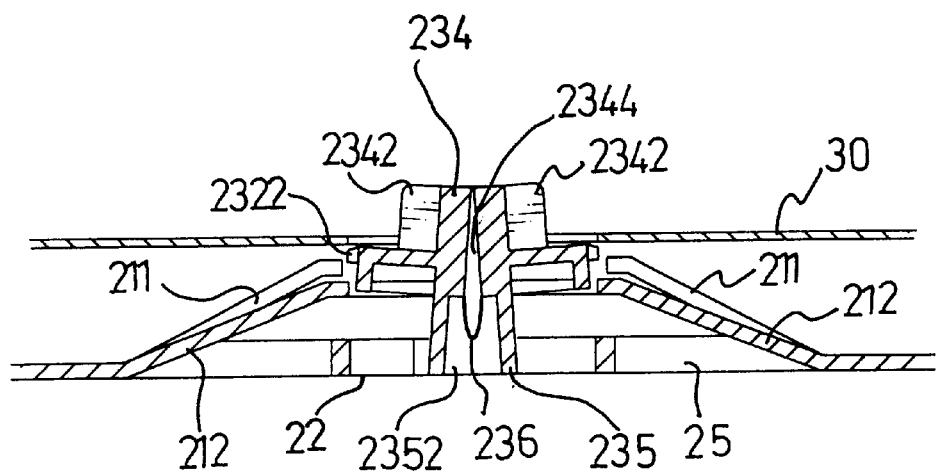
FIG. 6 is a cross-sectional view of the retaining center of FIG. 1, with the DVD/VCD/CD being removed therefrom.
Figure 7:
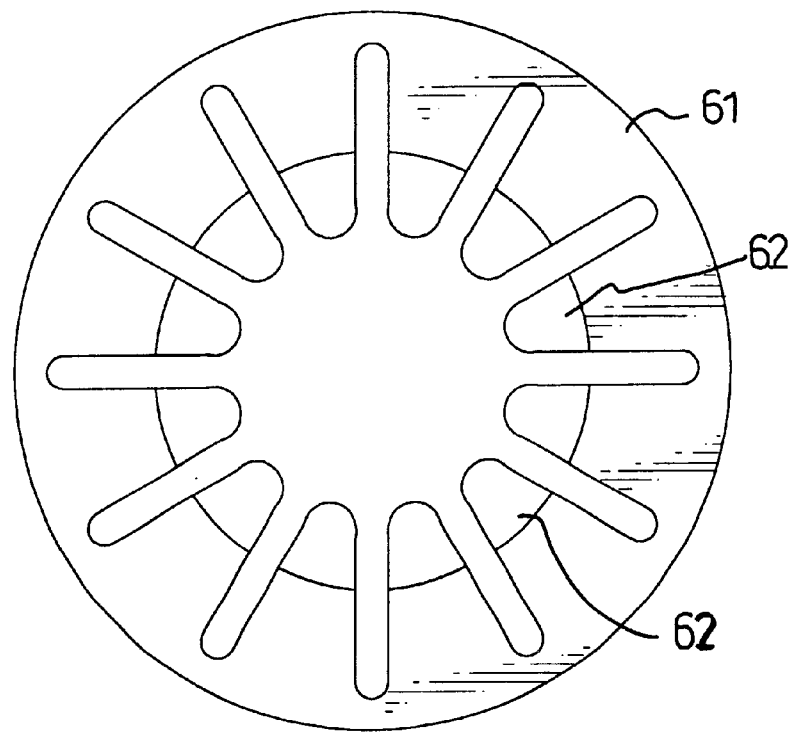
FIG. 7 is a top view of a first prior art retaining center for a DVD/VCD/CD box.
Figure 8:
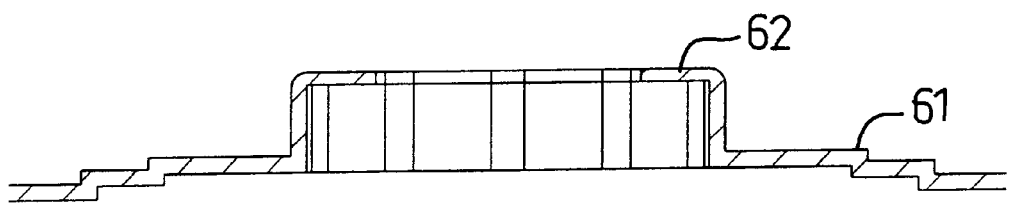
FIG. 8 is a cross-sectional view of the prior art retaining center shown in FIG. 7.
Figure 9:
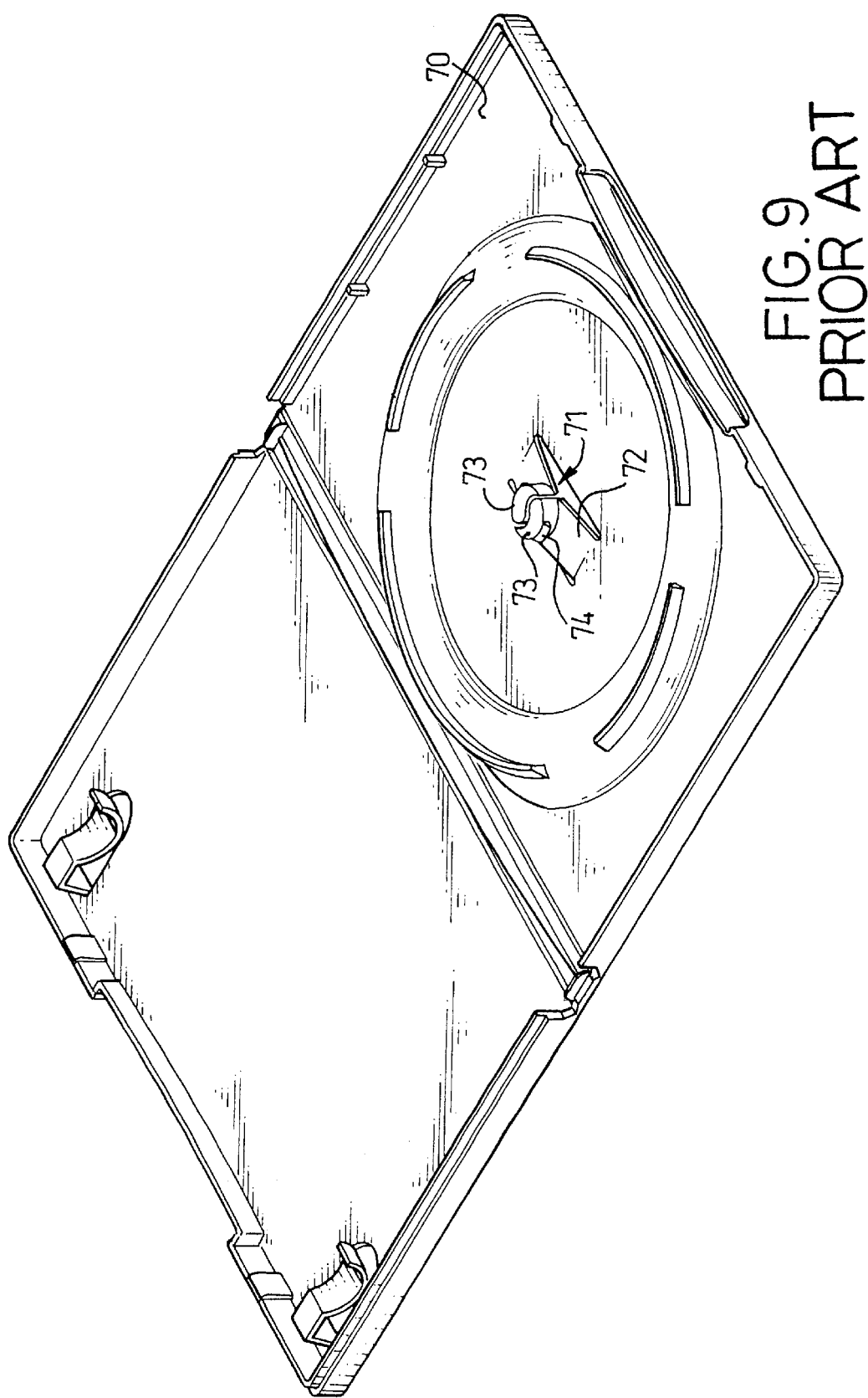
FIG. 9 is a perspective view of a second prior art retaining center for a DVD/VCD/CD box.

Referring to FIGS. 4, 5, and 6, the column (23) comprises a flange (232), a mount (234) extending upward from a top face of the flange (232), and a bottom tube (235) extending from a bottom face of the flange (232). The mount (234) comprises two kidney-shaped portions (2342) separated by a slit (2344), and the slit (2344) communicates with a through hole (2352) defined in the bottom tube (235). A U-shaped resilient sheet (236) is formed at an intersection between the slit (2344) and the through hole (2352), and extends into the through hole (2352). Two diametrically-opposed lips (2322) are formed on an outer periphery of the flange (232). The column (23) has an extended state as shown in FIG. 4, and a compressed state as shown in FIG. 6, wherein the mount (234) is squeezed by the fingers of a user such that the slit (2344) is closed at a top thereof and the lips (2322) are drawn closer to each other, whereby a distance thereacross is now smaller than a diameter of the central hole of the DVD/VCD/CD (30). When the user's grip on the mount (234) is released, the sheet (236) causes the column (23) to return to its extended state, whereby the lips (2322) also return such that the distance thereacross is again greater than the diameter of the central hole of the DVD/VCD/CD (30).

In operation, referring to FIGS. 4, 5, and 6, the user guides the DVD/VCD/CD (30) onto the column (23) such that the central hole of the DVD/VCD/CD (30) aligns with the mount (234) of the column (20). Downward pressure on the DVD/VCD/CD (30) via the user's finger tips causes the mount (234) of the column (23) to compress, and thus the column (23) is moved to the compressed state, and the periphery of the central hole of the DVD/VCD/CD (30) passes over the lips (2322), whereby an under face of the DVD/VCD/CD (30) now abuts top faces of the first and second segments (211, 212). The fact that the first segments (211) were originally higher than the second segments (212) ensures that the DVD/VCD/CD (30) is correctly mounted over the column (23) and not askew, whereby the DVD/VCD/CD (30) is securely received in the box. Furthermore, the kidney-shaped portions (2342) of the column (23) ensure firm yet smooth fitting of the DVD/VCD/CD (30). The lips (2322) ensure the DVD/VCD/CD (30) is securely retained on the column (23) until removal of the DVD/VCD/CD (30) is required, which is done in the following way:

The user compresses the mount (234) of the column (23) until the distance across the lips (2322) is smaller than the diameter of the central hole of the DVD/VCD/CD (30), and then the DVD/VCD/CD (30) is merely pulled away from the box.

The retaining center for a DVD/VCD/CD box in accordance with the present invention has the following advantages:

a. the DVD/VCD/CD (30) is guided well into fitting in the box due to the kidney-shaped portions (2342) of the column (23);

b. the three points of contact via the first segments (211) ensures that the DVD/VCD/CD (30) is flat in the box; and c. the lips (2322) ensure the DVD/VCD/CD (30) is securely held in place until access thereof is required.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining center for a DVD/VCD/CD box, wherein a DVD/VCD/CD can be conveniently removed from, and reliably and securely retained in the DVD/VCD/CD box without fracture of the retaining center, comprising:

a tray with a raised ring portion having an inner diameter sized slightly larger than an outer diameter of a DVD/VCD/CD; and a retaining device formed in a center of the tray and comprising a first guidance element having a plurality of inclined first segments, each first segment having a common fixed size, a common height, and a distal edge higher than a fixed edge integrally formed with the tray, a plurality of second segments corresponding to and equi-spaced among the first segments, each second segment having a common fixed size, a common height, and a distal edge higher than a fixed edge integrally formed with the tray but lower than the distal edges of the first inclined segment, and a polygonal base formed below the first and second segments, a plurality of ribs extending respectively from faces of the polygonal base to the corresponding first and second segments, and a second guidance element mounted in a center of the first guidance element, and a retaining element formed on a periphery of the second guidance element and above the first guidance element, wherein the first segments are resiliently deformable such that the distal edges thereof can align in height with the distal edges of the second segments, whereby a DVD/VCD/CD can be fitted flatly, reliably, and securely on the retaining center.

2. The retaining center for a DVD/VCD/CD box as claimed in claim 1, wherein the second guidance element includes a column having a flange with a diameter nominally smaller than a diameter of a central hole of a DVD/VCD/ CD, a resilient mount extending from a top face of the flange and having a maximum diameter the same size as the diameter of the flange, a tube extending from a bottom face of the flange, and a resilient sheet extending between the tube and the flange, whereby the central hole of a DVD/ VCD/CD can be mated with or removed from the second guidance element due to resiliency of the column.

3. The retaining center for a DVD/VCD/CD box as claimed in claim 2, wherein the resilient mount comprises two symmetrically disposed kidney-shaped portions separated by a slit.

4. The retaining center for a DVD/VCD/CD box as claimed in claim 2 wherein the retaining element comprises at least two lips formed on an outer periphery of the flange and a distance between distal edges thereof being nominally greater than the diameter of the central hole of a DVD/VCD/ CD, whereby a DVD/VCD/CD can be securely retained on the retaining center by the lips.

5. The retaining center for a DVD/VCD/CD box as claimed in claim 1, wherein the quantity of first segments is three, and the quantity of second segments is three.

6. The retaining center for a DVD/VCD/CD as claimed in claim 1, wherein the base is hexagonal.

7. The retaining center for a DVD/VCD/CD box as claimed in claim 1, wherein the distal edges of the first and second segments are respectively parallel with corresponding faces of the polygonal base.

* * * * *